(12) United States Patent
Braams

(10) Patent No.: US 9,910,996 B2
(45) Date of Patent: Mar. 6, 2018

(54) MASS STORAGE DEVICE MEMORY ENCRYPTION METHODS, SYSTEMS, AND APPARATUS

(75) Inventor: Harm Braams, Nieuwegein (NL)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 945 days.

(21) Appl. No.: 13/162,166

(22) Filed: Jun. 16, 2011

(65) Prior Publication Data

US 2011/0314304 A1    Dec. 22, 2011

Related U.S. Application Data

(60) Provisional application No. 61/355,399, filed on Jun. 16, 2010.

(51) Int. Cl.
*G06F 21/62* (2013.01)
*G06F 21/79* (2013.01)

(52) U.S. Cl.
CPC .............. *G06F 21/62* (2013.01); *G06F 21/79* (2013.01)

(58) Field of Classification Search
CPC .... G06F 21/29; G06F 13/00; G06F 17/30902; G06F 2221/0711; G06F 21/62; H04L 9/0877; H04L 9/0861; H04L 9/3234
(Continued)

(56) References Cited

U.S. PATENT DOCUMENTS 5,058,164 A * 10/1991 Elmer et al. ................... 713/190
5,280,640 A * 1/1994 Bae ....................... H03J 1/0091
                                                                 348/732

(Continued)

FOREIGN PATENT DOCUMENTS

| CN | 1833233 | 9/2006 |
|---|---|---|
| CN | 101536007 | 9/2009 |

(Continued)

OTHER PUBLICATIONS

International Application Serial No. PCT/US2011/040729, Partial International Search Report dated Oct. 25, 2011, 6 pgs.

(Continued)

*Primary Examiner* — James Turchen
(74) *Attorney, Agent, or Firm* — RatnerPrestia

(57) ABSTRACT

Mass storage devices and methods for securely storing data are disclosed. The mass storage device includes a communication interface for communicating with a connected host computer, a mass-memory storage component for storing data, a secure key storage component adapted to securely store at least one master secret, and an encryption-decryption component different from the secure key storage component and connected to the secure key storage component and the mass-memory storage component. The encryption-decryption component may be adapted to encrypt data received from the host computer using an encryption algorithm and at least one encryption key and to write the encrypted data into the mass-memory storage component. The encryption-decryption component may also be adapted to decrypt encrypted data stored in the mass-memory storage component for returning the data to the host computer in response to a read data command from the host computer using a decryption algorithm and at least one decryption key the security of which is protected using a master secret securely stored in the secure key storage component.

5 Claims, 8 Drawing Sheets

(58) Field of Classification Search
USPC .......................................................... 713/193
See application file for complete search history.

(56) References Cited

U.S. PATENT DOCUMENTS

| | | | |
|---|---|---|---|
| 6,014,745 A * | 1/2000 | Ashe ............................ | 713/193 |
| 7,814,337 B2 * | 10/2010 | Lee et al. ...................... | 713/193 |
| 8,555,059 B2 * | 10/2013 | McKelvey et al. ........... | 713/165 |
| 2002/0184490 A1 * | 12/2002 | McCown et al. ............. | 713/155 |
| 2005/0081047 A1 | 4/2005 | Kitani | |
| 2006/0039560 A1 * | 2/2006 | Wasilewski ...... | G11B 20/00086 380/228 |
| 2007/0198856 A1 * | 8/2007 | Lee et al. ...................... | 713/190 |
| 2007/0300052 A1 * | 12/2007 | Jevans .................... | G06F 21/34 713/1 |
| 2008/0107275 A1 * | 5/2008 | Asnaashari ............. | G06F 21/80 380/281 |
| 2008/0263363 A1 * | 10/2008 | Jueneman ............... | G06F 21/32 713/184 |
| 2009/0110191 A1 * | 4/2009 | Sanvido ................ | H04L 9/0822 380/44 |
| 2011/0022856 A1 * | 1/2011 | Ureche ................. | G06F 21/602 713/193 |
| 2011/0185190 A1 * | 7/2011 | Berengoltz ......... | G06F 21/6218 713/189 |
| 2011/0252243 A1 * | 10/2011 | Brouwer ............... | H04L 9/0838 713/189 |
| 2011/0258437 A1 * | 10/2011 | McKelvey et al. ........... | 713/165 |
| 2012/0069995 A1 * | 3/2012 | Matthews, Jr. ................ | 380/44 |
| 2012/0311288 A1 * | 12/2012 | Callas ................. | G06F 12/1408 711/166 |

FOREIGN PATENT DOCUMENTS

| | | |
|---|---|---|
| EP | 0455064 A2 | 11/1991 |
| WO | WO-2008127408 A2 | 10/2008 |

OTHER PUBLICATIONS

Universal Serial Bus—Device Class: Smart Card—CCID—Specification for Integrated Circuit(s) Cards Interface Devices—revision 1.1, Apr. 22, 2005.
English translation of the 1$^{st}$ Office Action for Chinese Application CN 201180039746.8 dated May 6, 2015.
Chinese Search Report for CN 201180039746.8 dated Apr. 21, 2015.
Second Office Action for Chinese Application CN 201180039746.8, with translation, dated Feb. 23, 2016.
Chinese Search Report for CN 201180039746.8, with translation, dated Feb. 2, 2016.
Third Office Action for Chinese Application No. CN 201180039746.8, including English translation, dated Oct. 31, 2016, 21 pages.

* cited by examiner

MASS STORAGE DEVICE MEMORY ENCRYPTION METHODS, SYSTEMS, AND APPARATUS

CROSS REFERENCE TO RELATED APPLICATIONS

This application claims priority to U.S. Provisional Application Serial No. 61/355,399 filed on Jun. 16, 2010, entitled Mass Storage Device with On-The-Fly Encryption, the contents of which are incorporated fully herein by reference.

BACKGROUND OF THE INVENTION

Small portable electronic devices that are capable of storing relatively large amounts of data (e.g. hundreds of megabytes or several gigabytes, sometimes tens of gigabytes) and that can be easily connected to and disconnected from computers are becoming ever more popular as they provide a convenient way for users to transport computer data. In many cases such devices can be easily connected to a host computer by means of plug-and-play technology and present themselves to the host computer's operating system as a mass storage device (MSD) with a standard file system. In many cases the interface to connect the device to the host computer is of the USB (Universal Serial Bus) type. So called USB keys or USB memory sticks are examples of such devices. In some cases the device offers other functionality or the mass storage functionality is integrated into a device with another main functionality. For example, some USB keys also contain a smart card or smart card chip and offer security functions (often in the context of a Public Key Infrastructure (PKI)), while many digital cameras can be connected to a computer via a USB connection and are then visible to the host computer as a mass storage device.

Because they are so convenient for transporting computer data, these portable mass storage devices are often used to store and transport confidential or otherwise sensitive data. As such they may represent a security risk that is exacerbated by their relatively small size, which makes them prone to theft or loss.

DETAILED DESCRIPTION OF THE INVENTION

Figure 1:
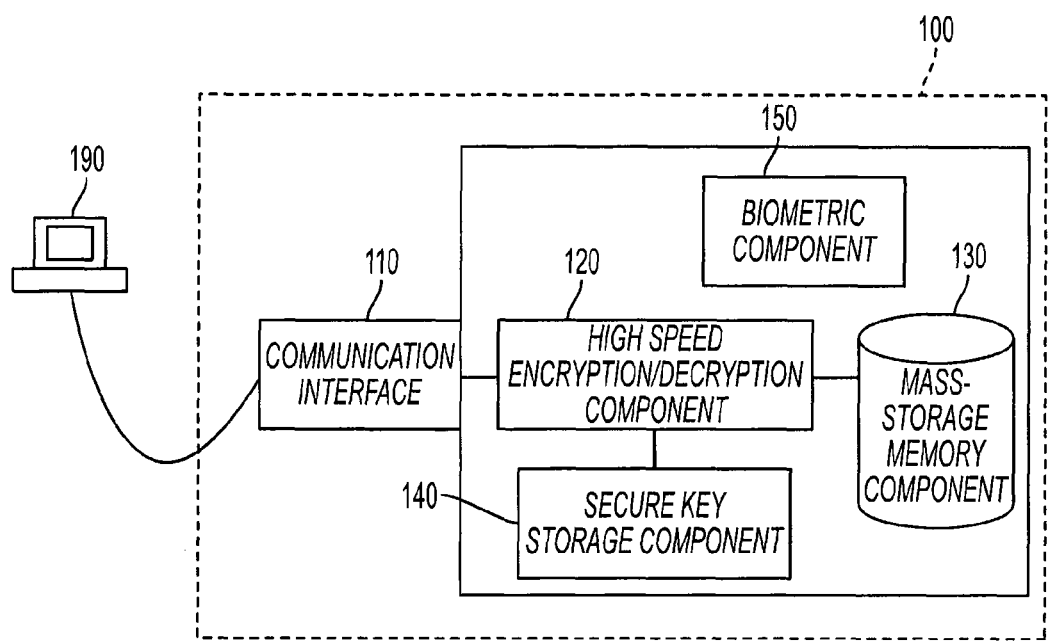
FIG. 1 is a block diagram depicting a mass storage device in accordance with aspects of the present invention.

The inventors have recognized that a portable mass storage device is needed that has the capability of encrypting and decrypting stored data on-the-fly as these data are being read from or written to the mass storage memory of the portable mass storage device.

A technical problem for a portable mass storage device that has the capability of encrypting stored data is that the security of the keys that are used to encrypt and decrypt the stored data must be sufficiently high. Another technical problem is that, in view of the large amounts of data to be encrypted or decrypted, the encryption and decryption speed must be sufficiently high so as not to slow down reading and writing operations in an unacceptable way. A particular challenge is to solve these two problems using relatively inexpensive standard components.

Aspects of the invention are based on the insight by the inventor that the two problems mentioned above can be overcome by a mass storage device that includes: (1) on the one hand a first secure key storage component that is capable of securely storing secrets, and (2) on the other hand a second high-speed encryption/decryption component that is capable of encrypting and decrypting at high speed large amounts of data (e.g. hundreds of megabytes or several gigabytes) that are written to or read from the mass storage memory of the mass storage device, whereby the confidentiality of at least some of the encryption and decryption keys that the high-speed encryption/decryption component uses for encrypting and decrypting data that is written to or read from the mass storage memory is protected by security mechanisms that use secrets that are securely stored in the secure key storage component. For example the bulk encryption and decryption keys may be directly stored in the secure key storage component, or they may be derived from secrets that are securely stored in the secure key storage component, or they are stored elsewhere (e.g. on the mass storage memory) and encrypted with keys that are directly stored in the secure key storage component or encrypted with keys that are derived from keys that are stored in the secure key storage component, or they are derived from keys that are stored elsewhere (e.g. on the mass storage memory) and encrypted with keys that are directly stored in the secure key storage component or encrypted with keys that are derived from keys that are stored in the secure key storage component.

Another aspect of the invention includes a method for encrypting and decrypting data stored in the mass storage memory of devices with mass storage functionality.

Yet another aspect of the invention includes a method to generate and manage some secret keys stored in the mass storage device (MSD) and to initialize the mass storage device with these secret keys.

A purpose of memory encryption is to ensure the confidentiality of the data content of the mass storage device. In the normal situation, only the genuine owner of the device should be able to obtain the clear-text content of his or her device. To achieve this goal the mass storage device may require authentication of the user by the mass storage device. The user's authentication may be required for both read and write operations or only for write operations or only for read operations. A successful authentication may open up the device for a single operation or for several operations. For example the user may be required to authenticate every time for each read operation, or the user may be required to authenticate only once before the first operation and as long as the device remains powered and connected to the host computer, or the user may have to authenticate when the device is connected to the host computer and thereafter after specific time intervals or periods of inactivity. Several techniques to authenticate the user may be used. In one embodiment the user may be required to provide a PIN or a password while in other embodiments the user may be authenticated by means of biometric authentication techniques for example comparing the user's fingerprints with a reference fingerprint stored in the mass storage device.

In one embodiment the mass storage device includes: (1) a mass storage memory component, (2) a secure key storage component that is capable of securely storing secrets, (3) a high-speed encryption/decryption component that is capable of encrypting and decrypting at high speed data that is written to or read from the mass storage memory of the mass storage device, (4) a communication interface to communicate with a host computer the mass storage device is connected to.

In this context a secure key storage component is a component that is capable of storing sensitive data (such as PIN or password values or other user authentication related reference data and secrets such as secret cryptographic keys) in a non-volatile way and that has been designed to withstand a range of attacks that aim to compromise the sensitive data e.g. by breaking the confidentiality (e.g. obtaining the value of a secret key) or breaking the integrity of the sensitive data (e.g. overwriting the reference value of a PIN or the value of a PIN try counter). Smart cards or smart card chips are a good example of secure key storage components. To withstand attacks, secure key storage components may have been provided with a number of security mechanisms. These security mechanisms may include measures on a logical level such as access control on read and write operations or access control on certain operations involving the use of sensitive data (e.g. encryption or decryption operations using secret keys) whereby access to these operations can be granted or denied depending on certain conditions such as the user authentication status (e.g. a request to change the PIN value or a request to perform a decryption operation with a secret key stored in the component may only be granted after the user's PIN has been successfully verified). Other security measures may include physical measures such as small dimensions to make probing attacks more difficult or shields to prevent electromagnetic leakage. Still other measures might be targeted to thwart certain types of attack that try to obtain information on sensitive data based on e.g. timing or power analysis. The secure key storage component may have sensors to detect if the component is made to work outside its allowed parameter range (e.g. allowed supply voltage, allowed clock speed) which may indicate an attack based on inducing errors. The secure key storage component may also have sensors to detect whether the component is being probed. These sensors may include voltage, temperature, frequency, light sensors. The secure key storage component may have provisions to scramble and/or encrypt any data being stored in memory and/or being transferred over a bus. Secure key storage components may comply with the FIPS 140-2 or FIPS 140-3 standards. If so they may be certified against level 2 or higher. They may also be certified against an ISO/IEC 15408 -Common Criteria Protection Profile such as the Security IC Platform Protection Profile Version 1.0, known as CC-PP-0035-2007 or the Smartcard IC Platform Protection Profile CC-PP-0002-2001.

It is desirable that the high-speed encryption/decryption component has enough processing power to perform bulk encryption or decryption of the data to be read from or written to the mass storage device at a speed that is high enough to not significantly slow down the reading and writing of the data.

In an embodiment the secure key storage component and the encryption/decryption component are connected so that they can exchange secrets and keys.

An advantage of this architecture is that it is possible to use inexpensive standard components whereby the secure key storage component is optimized for secure storage of secrets of a relatively small size (e.g. tens of bytes up to hundreds or thousands of bytes) but is not required to be capable of high speed bulk encryption and decryption of large amounts of data nor of securely storing large amounts of data, and whereby the encryption/decryption component offers enough processing power to do bulk encryption or decryption of relatively large amounts of data but is not required to offer non-volatile secure storage of secrets and secret keys, and whereby the mass storage memory component is capable to cost-effectively store large amounts of data (e.g. hundreds of megabytes or gigabytes of data) without a requirement to provide any security mechanisms.

In some embodiments the secure key storage component stores one or more master secrets that are used to protect the security of one or more secret encryption/decryption keys that the high-speed encryption/decryption component uses for encrypting and decrypting data that is written to or read from the mass storage memory.

In some embodiments the one or more master secrets stored in the secure key storage component include one or more symmetric encryption or decryption keys. In some embodiments the one or more master secrets stored in the secure key storage component include one or more asymmetric private keys from one or more public-private key pairs.

In some embodiments some of the protection mechanisms to protect the security of encryption/decryption keys that the high-speed encryption/decryption component uses require access by the high-speed encryption/decryption component to master secrets stored on the secure key storage component. In some embodiments this access includes read access. In some embodiments this access includes execution access to cryptographic operations carried out by the secure key storage component and using one or more master secrets. In some embodiments these cryptographic operations include key derivation operations. In some embodiments these operations include encryption or decryption operations using the master secret(s), or one or more keys derived from the master secret(s), as encryption or decryption key(s).

In some embodiments access to the master secrets stored on the secure key storage component (which may include read access or execution access to operations involving the secure key storage component using the master secrets) is protected by access control mechanisms. In some embodiments these access control mechanisms include verification by the secure key storage component of certain statuses. In some embodiments these access control mechanisms include verification by the secure key storage component of a user authentication status. In some embodiments these access control mechanisms require that the user has been successfully authenticated to the secure key storage component. In some embodiments these access control mechanisms require that a correct PIN or password value was submitted to the secure key storage component. In some embodiments these access control mechanisms require that a biometric (e.g. a fingerprint measurement) is submitted that satisfies some criterion e.g. that it compares favorably with a biometric reference template. In a particular embodiment the secure key storage component stores a biometric reference template. In a particular embodiment the verification of the submitted biometric is done by the secure key storage component e.g. by comparing the biometric measurement with a biometric reference template. In a particular embodiment the mass storage device includes a biometric verification component to verify biometric measurements. In a particular embodiment the biometric verification component communicates the outcome of the biometric verification to the secure key storage component using a secure protocol that allows the secure key storage component to authenticate the biometric verification component.

In some embodiments the secure key storage component directly stores one or more secret encryption/decryption keys that the high-speed encryption/decryption component uses for encrypting and decrypting data that is written to or read from the mass storage memory.

In some embodiments the secure key storage component stores one or more secrets that are used to derive encryption/decryption keys that the high-speed encryption/decryption component uses for encrypting and decrypting data that is written to or read from the mass storage memory. Depending on the embodiment steps of the derivation process of the encryption/decryption keys may be performed by the secure key storage component and/or by the high-speed encryption/decryption component.

In some embodiments the secure key storage component uses secrets that it securely stores to derive encryption/decryption keys that are used by the high-speed encryption/decryption component for encrypting and decrypting data that is written to or read from the mass storage memory.

In some embodiments the high-speed encryption/decryption component derives encryption/decryption keys that it uses for encrypting and decrypting data that is written to or read from the mass storage memory from secrets that are securely stored in the secure key storage component.

In some embodiments the secure key storage component uses master secrets that it securely stores to derive intermediate secrets that are used by the high-speed encryption/decryption component to derive encryption/decryption keys that the high-speed encryption/decryption component uses for encrypting and decrypting data that is written to or read from the mass storage memory.

In some embodiments master secrets stored in the secure key storage component or keys derived from master secrets secure key storage component are used to encrypt or decrypt intermediate keys or secrets that are stored outside the key storage component and that are used to obtain (or that are themselves) encryption/decryption keys that the high-speed encryption/decryption component uses for encrypting and decrypting data that is written to or read from the mass storage memory. In a particular embodiment the secure key storage component uses a master key stored in the secure key storage component to decrypt an encrypted secret key that is stored on the mass storage memory component and the high-speed encryption/decryption component uses the decrypted key to decrypt or encrypt data that is read from or written to the mass storage memory component.

In a particular embodiment secrets that are provided by the user are used by the secure key storage component and/or the high-speed encryption/decryption component for deriving encryption/decryption keys or intermediate secrets. In some particular embodiments these secrets provided by the user may include a PIN or password value.

In one embodiment the communication interface to communicate with a host computer includes a USB interface. In other embodiments other wired or wireless technologies may be used for the communication interface with the host computer, for example, IEEE 1394 or FireWire.

In one embodiment the mass storage memory component includes a solid state memory chip. In another embodiment the mass storage memory component includes a flash memory. Other memory technologies may also be used such as: electrically erasable programmable read-only memory (EEPROM), programmable metallization cell (PMC), conductive-bridging RAM (CBRAM), Ferroelectric RAM (Fe-RAM or FRAM), Magnetoresistive Random Access Memory (MRAM), Phase-change memory (also known as PCM, PRAM, PCRAM, Ovonic Unified Memory, Chalcogenide RAM and C-RAM), or others.

In one embodiment the secure key storage component includes a smart card or smart card chip. The smart card chip may be a chip as used for smart cards adhering to the ISO/IEC 7816 specifications. In some embodiments the secure key storage component includes a smart card chip that is fixedly integrated into the mass storage device. In other embodiments the secure key storage component includes a removable smart card, such as the ID-000 format (as used for SIM cards), but other formats such as the ID-1 format may be used. Examples of smart cards or smart card chips that may be used include: the Oberthur ID-One Smart Card Chip, Siemens CardOS, G&D StarCOS, chips from the Infineon SLE66 family, or others.

In some embodiments the secure key storage component also provides other security functions such as storing or verifying PINs or passwords, securely storing confidential data, providing PKI related functions and cryptographic operations, operations involving symmetric or asymmetric cryptographic operations, storing certificates, storing biometric reference templates, performing biometric verifications, generation of one-time passwords, or others.

An advantage of using a smart card or smart card chip for the secure key storage component is that standard methods and existing proven infrastructure, tools and components can be used for the key management of the secrets stored in the secure key storage component.

Another advantage of using a smart card or smart card chip for the secure key storage component is that these components may have been tested and certified against high security standards.

In one embodiment the encryption/decryption component includes a general purpose processor such as an ARM processor. The encryption/decryption component may handle communication with the host computer and management of the memory. An example of a processor that could be used for the encryption/decryption component is the Atmel AT32UC3A3 (AVR) processor.

In one embodiment the encryption/decryption component uses an encryption/decryption method that is based on a symmetric encryption/decryption algorithm such as AES (Advanced Encryption Standard) or 3DES (Triple DES, Data Encryption Standard).

In an embodiment the encryption/decryption component encrypts or decrypts on-the-fly the data that the host computer requests to be written or read.

FIG. 1 illustrates the architecture of a mass storage device (100) according to an embodiment of the invention. The device (100) includes a communication interface (110) to communicate with a host computer (190), a high-speed encryption/decryption component (120), a mass-storage memory component (130) and a secure key storage component (140). In an embodiment the high-speed encryption/decryption component (120) is connected to the communication interface (110), the mass-storage memory component (130) and the secure key storage component (140).

In some embodiments the high-speed encryption/decryption component (120), the mass-storage memory component (130) and the secure key storage component (140) include electronic components that are laid out on a substrate. In some embodiments this substrate includes a PCB (Printed Circuit Board). In some embodiments the communication interface (110), the high-speed encryption/decryption component (120), the mass-storage memory component (130) and the secure key storage component (140) are embedded in a single packaging or contained in a single housing. In some embodiments the communication interface (110), the high-speed encryption/decryption component (120), the mass-storage memory component (130) and the secure key storage component (140) are fixedly attached. In some embodiments the mass-storage memory component (130) or an element thereof may be removable. In some embodiments the secure key storage component (140) or an element thereof may be removable. In some embodiments the mass-storage memory component (130) is connected to the high-speed encryption/decryption component (120) by means of a galvanic connection. In some embodiments the secure key storage component (140) is connected to the high-speed encryption/decryption component (120) by means of a galvanic connection.

In some embodiments the mass storage device (100) is a portable device within a housing such as a conventional USB flash drive housing. In some embodiments the housed mass storage device (100) has dimensions and weight which make it easy and convenient for a user to carry the device in the user's pockets. In some embodiments the mass storage device (100) is a handheld device which in the context of this application means that the housed mass storage device (100) has dimensions and weight which make it comparable to a typical cell phone or PDA i.e. a handheld embodiment has a weight that preferably does not exceed 300 grams, a volume that preferably does not exceed 100 cubic centimeters, a maximum length in one direction that preferably does not exceed 15 centimeters. In some embodiments the mass storage device (100) is key-sized which in the context of this application means that the housed mass storage device (100) has dimensions and weight which make it comparable to a car key or typical USB memory sticks i.e. a key-sized embodiment has a weight that preferably does not exceed 75 grams, a volume that preferably does not exceed 35 cubic centimeters, a maximum length in one direction that preferably does not exceed 10 centimeters. In some embodiments the housing of the mass storage device (100) includes provisions, such as a ring, to attach the device (100) to a key ring.

In some embodiments, when the mass storage device (100) is connected to a host computer (190), it relies on the host computer (190) to provide its power supply. In some embodiments the communication interface (110) includes a galvanic connection for the host computer (190) to supply power to the device (100). In some embodiments the device (100) has no autonomous power supply. In some embodiments when the device (100) is not connected to a host computer it relies entirely on passive security measures protecting the master secrets stored in the secure key storage component (140) to protect the confidentiality of encrypted data stored on the mass-storage memory component (130). In some embodiments the device (100) has an autonomous power supply to supply power to the device (100) when it is not connected to a host computer (190). In some embodiments this autonomous power supply may include a battery.

In some embodiments the high-speed encryption/decryption component (120) and the secure key storage component (140) are physically different components.

In some embodiments the data to be read from or written to the mass storage device (100) is exchanged between the host computer (190) and the mass storage device (100) over the communication interface (110). In one embodiment the communication interface (110) includes a physical connector. In a particular embodiment the communication interface (110) includes a USB connector. In other embodiments the communication interface (110) may include a 4-circuit or 6-circuit FireWire 400 alpha connector.

In some embodiments the mass storage device (100) supports a plug-and-play capability when being connected to a host computer (190).

In some embodiments the high-speed encryption/decryption component (120) includes a processor or microcontroller. In other embodiments the high-speed encryption/decryption component (120) includes an ASIC (Application Specific Integrated Circuit). In yet other embodiments the high-speed encryption/decryption component (120) includes an FPGA (Field Programmable Gate Array). In some embodiments the high-speed encryption/decryption component (120) is adapted to handle the communication protocol with the host computer (190) over communication interface (110). In some embodiments the high-speed encryption/decryption component (120) is adapted to handle the USB communication protocol to communicate with the host computer (190) over communication interface (110). In other embodiments the high-speed encryption/decryption component (120) is adapted to handle the USB communication protocol to communicate with the host computer (190) over communication interface (110). In some embodiments the high-speed encryption/decryption component (120) includes an ARM processor. In a particular embodiment the high-speed encryption/decryption component (120) includes an Atmel AT32UC3A3 processor.

In some embodiments the mass-storage memory component (130) includes flash memory. In some embodiments the mass-storage memory component (130) includes a NAND flash integrated circuit. In some embodiments the mass-storage memory component (130) includes a NOR flash integrated circuit. In some embodiments the mass-storage memory component (130) includes a memory card. In some embodiments the mass-storage memory component (130) includes an SD (Secure Digital) card. In other embodiments the mass-storage memory component (130) includes a CompactFlash card. In still other embodiments the mass-storage memory component (130) includes an MMC (MultiMediaCard) card. In some embodiments the high-speed encryption/decryption component (120) component is adapted to interface directly on a low level with a flash memory chip and to handle reading and programming as well as erasing of the flash memory and to handle the memory wear. In other embodiments the high-speed encryption/decryption component (120) component is adapted to interface with a controller which handles the low level interface with a memory chip.

In some embodiments the secure key storage component (140) includes non-volatile memory to securely store secrets such as one or more cryptographic keys or seed values and/or other confidential or security sensitive data such as one or more PIN or password values or biometric reference values. In other embodiments the secure key storage component (140) has one or more active or passive security mechanisms to protect against unauthorized access to sensitive or confidential data and/or to protect against unauthorized attempts to alter the value of certain security related data elements such as PINs, passwords or biometric reference data, or PIN Try Counters or security settings. In some embodiments the secure key storage component (140) includes a smart card or smart card chip. The smart card chip may be a chip as used for smart cards adhering to the ISO/IEC 7816 specifications. In some embodiments the secure key storage component includes a smart card chip that is fixedly integrated into the mass storage device. In other embodiments the secure key storage component includes a removable smart card, e.g., of the ID-000 format (as used for SIM cards), but also other formats such as the ID-1 format may be used.

Examples of smart cards or smart card chips that may be used include: the Oberthur ID-One Smart Card Chip, Siemens CardOS, G&D StarCOS, or others. In some embodiments the high-speed encryption/decryption component (120) component communicates with the secure key storage component (140) using smart card commands. In some embodiments the high-speed encryption/decryption component (120) component is adapted to exchange smart card commands with the secure key storage component (140) using protocols according to the ISO/IEC 7816 specifications. In some embodiments the high-speed encryption/decryption component (120) component is adapted to exchange smart card commands with the secure key storage component (140) using the T=0 and/or T=1 smart card protocols. In some embodiments the high-speed encryption/decryption component (120) component is adapted to handle a smart card reader protocol to exchange smart card commands with the host computer (190). In some embodiments the high-speed encryption/decryption component (120) component is adapted to support the USB CCID (Integrated Circuit(s) Cards Interface Device) protocol (see also 'Universal Serial Bus—Device Class: Smart Card—CCID—Specification for Integrated Circuit(s) Cards Interface Devices—revision 1.1, Apr. 22, 2005, available at http://en.wikipedia.org/wiki/Integrated_Circuit_Card_Interface_Device, which is incorporated fully herein by reference). In some embodiments the high-speed encryption/decryption component (120) may support another protocol to exchange smart card commands with the host computer.

In some embodiments the mass storage device (100) is adapted to give read and/or write access to certain parts of the mass storage memory (130) only after the user has been successfully authenticated. In some embodiments the user is authenticated by means of verification of a PIN or a password submitted by the user to the device (100). In some embodiments the user is authenticated by verification of some biometric of the user. In some embodiments the mass storage device (100) includes a biometric component (150). In some embodiments this biometric component (150) includes a biometric sensor. In some embodiments the biometric sensor includes a fingerprint sensor. In some embodiments the biometric component is adapted to measure some biometric of the user. In some embodiments the biometric component is adapted to verify a biometric measurement. In some embodiments the secure key storage component (140) is adapted to authenticate the user. In some embodiments the secure key storage component (140) is adapted to verify a PIN or password or to verify a biometric measurement. In some embodiments this biometric measurement may have been produced by a biometric component (150) on the device (100). In some embodiments the secure key storage component (140) stores a PIN or password reference value and is adapted to compare a submitted PIN or password to this stored reference value. In some embodiments the secure key storage component (140) stores a biometric reference template and is adapted to compare a submitted biometric measurement to this biometric reference template.

In some embodiments the mass storage device (100) includes a USB interface and, when connected to a USB host, presents itself as a collection of USB devices including at least one USB mass storage drive.

In some embodiments this presented collection of USB devices includes at least one secure USB mass storage drive securely storing encrypted data. In some embodiments the device grants read and/or write access to these encrypted data only after successful user authentication.

In some embodiments the presented collection of USB devices also includes a USB mass storage drive offering free read and write access to its stored data contents.

In some embodiments the presented collection of USB devices also includes a USB smart card reader. In some embodiments this card reader presents itself as containing a smart card. In some embodiments this smart card may offer PKI functionality e.g. to make electronic signatures.

In some embodiments the collection of USB devices that the device (100) presents to the host computer (190) also includes a virtual USB CD-ROM drive with an inserted CD-ROM. The inserted CD-ROM may store pre-installed software for execution on the host computer such as a secure internet browser or PKI middleware to interface with the aforementioned PKI enabled smart card. The inserted CD-ROM may also store one or more device security applications that are adapted to allow the user to manage various security aspects of the device (100). This security application may for example allow users to authenticate themselves to the device by means of entering a password or PIN.

In some embodiments, upon successful user authentication, the device (100) may grant the user access to the secure mass storage memory. In some embodiments the security application may also offer the user the possibility to do PIN or password management such as changing the PIN or password or unblocking a blocked PIN or password. In some embodiments the security application may also offer the user the possibility to manage his or her biometrics such as enrolling reference fingerprints. In some embodiments the security application allows the user to explicitly lock and unlock the secure mass storage memory. In some embodiments the device (100) may take advantage of an auto-run feature of the host computer's (190) operating system to automatically launch an application stored on its virtual USB CD-ROM upon connection of the device (100) to the host computer (190).

In some embodiments upon connection of the device (100) to the host computer (190), the device (100) presents to the host computer (190) at least one secure mass storage drive. Prior to authentication of the user, the secured contents of the secure mass storage drive may remain inaccessible. By using an authentication application (which may be one of the aforementioned security applications) the user can authenticate himself or herself to the device (100). After successful authentication of the user the secured contents of the secure mass storage drive become visible and accessible to the user from the host PC (190). The authentication application may be launched automatically by means of an auto-run feature, or alternatively may be launched by the user. In some embodiments the authentication application is the only content accessible on the secure mass storage drive prior to user authentication. In other embodiments the authentication application is visible to the user on another mass storage drive that the device (100) presents to the host computer (190) upon connection to the host computer (190). In some embodiments the secured contents of the secure mass storage drive remain visible and accessible to the user from the host PC (190) until the device (100) is disconnected (physically or logically) from the host computer (190). In other embodiments the user can explicitly lock the secure mass storage drive (and its secured contents become inaccessible again) for example by using some management application (e.g. the aforementioned authentication application of security application) to log-out. After the secure mass storage drive has thus been locked its secured contents remain inaccessible until the user authenticates again to unlock the secure mass storage drive.

In some particular embodiments the device (100) includes a USB connector interface (110) connected to a high-speed encryption/decryption component (120) including a USB processor. The processor is adapted to handle the USB protocol with a host computer (190) that the device (100) is connected to. The USB processor component (120) is also connected to a mass storage memory (130) which may include an SD card. The USB processor component (120) is adapted to handle the protocol to interface with the mass storage component (130) and is also adapted to handle the USB mass storage device protocol with the host computer (190). The USB processor component (120) is furthermore connected to a secure key storage component (140) including a smart card or smart card chip. The USB processor component (120) is adapted to handle protocols to exchange smart card commands and responses with the smart card or smart card chip e.g. according to the ISO/IEC 7816 specifications. The smart card or smart card chip is optionally adapted to be PKI enabled and to offer PKI related capabilities such as RSA encryption and decryption and generation of an RSA based digital signature. It may furthermore store certificates. The USB processor component (120) is furthermore adapted to handle a USB smart card reader protocol (e.g. CCID) with the host computer (190) to exchange smart card commands with the host computer (190). The memory on the mass storage component (130) is divided into the following parts: an (optional) public part containing data that can be freely read and written, a secured part containing secured data that can only be read and written after successful user authentication, and a read-only part containing read-only data. The data on the secured part are encrypted. The read-only data include (optionally) PKI middleware allowing PKI enabled applications on the host PC to request cryptographic services to the PKI enabled smart card or smart card chip. The read-only data may furthermore include an authentication application to be executed on the host computer (190). This application may allow a user to authenticate himself or herself to the device (100) e.g. by submitting a PIN value or password value or, in a particular embodiment, a biometric. Upon connection of the device (100) to a USB enabled host computer (190) the USB processor (120) presents to the host (190) the following USB devices: a USB smart card reader (with an inserted smart card), a first (optional) mass storage drive containing the freely accessible data of the public part of the mass storage memory, a second mass storage drive which prior to user authentication may only show the authentication application, a CD-ROM device with inserted CD-ROM containing the installation program for the PKI middleware. To access the protected date on the secured part of the mass storage memory, the user may start the authentication application visible in the second mass storage drive. This application may request the user to enter a PIN or password or to provide a biometric. The authentication application may then exchange some authentication related smart card commands (e.g. a PIN VERIFY command) with the device (100). The USB processor component (120) may transfer these commands and responses between the host computer (190) and the smart card or smart card chip. The USB processor component (120) may also monitor the authentication commands and responses to find out whether the user was successfully authenticated. In a particular embodiment the mass storage device includes a biometric component (150) which may include a biometric sensor e.g. a fingerprint sensor. The user may initiate authentication directly without intervention of an authentication application running on the host computer by directly activating this sensor e.g. by swiping a finger on a fingerprint sensor. The mass storage device may then verify the submitted biometric e.g. by comparing the submitted biometric with a biometric reference template. Once the USB processor component has concluded that the user has successfully been authenticated, it makes the contents of the secured part of the mass storage memory (130) visible and accessible to the host computer (190). When the host computer (190) wants to read secured data, the USB processor component (120) reads the encrypted data from the secured part of the mass storage memory (130) and decrypts this data on-the-fly using the appropriate decryption session key(s). When the host computer (190) wants to write secured data, the USB processor component (120) encrypts this data on-the-fly using the appropriate encryption session key(s) and writes the encrypted data to the secured part of the mass storage memory (130). The USB processor component (120) obtains or generates the appropriate encryption/decryption session keys from intermediate secrets that it gets from the smart card component (140). In some embodiments the encryption/decryption session keys may be equal to the intermediate secrets that the USB processor component (120) gets from the smart card component (140). In other embodiments the USB processor component (120) derives the values of the encryption/decryption session keys from the intermediate secrets that the USB processor component (120) gets from the smart card component (140) using some key derivation method. The smart card component (140) only grants a request for the intermediate secrets if the user has been successfully authenticated. If the user has not been successfully authenticated (or the user authentication has been undone e.g. by a log-off command) the smart card component does not grant a request for the intermediate secrets. In some embodiments the intermediate secrets are simply stored in a secure non-volatile memory of the smart card component (140). In other embodiments the smart card component (140) derives the intermediate secrets from one or more master secrets stored in a secure non-volatile memory of the smart card component (140) using some key derivation method. In some embodiments the USB processor component (120) obtains or generates the encryption/decryption session keys for each read/write operation of secured data and discards those keys again after each such operation. In other embodiments the USB processor component (120) obtains or generates the encryption/decryption session keys after successful user authentication and maintains the values of the encryption/decryption session keys or the values of the intermediate keys used to generate them until the device is disconnected or deactivated or until the user is de-authenticated (e.g. by an explicit log-off command or by a failed authentication command). In some embodiments the user authentication is performed by the secure key storage component (140) (for example by comparing a submitted PIN or password value to a reference value or by comparing a biometric measurement to a reference biometric template), the secure key storage component (140) maintains a user authentication status and grants access to the master secrets (e.g. read access or execution access to an operation using the master secrets) only if that status indicates that the user has been successfully authenticated.

Figure 2:
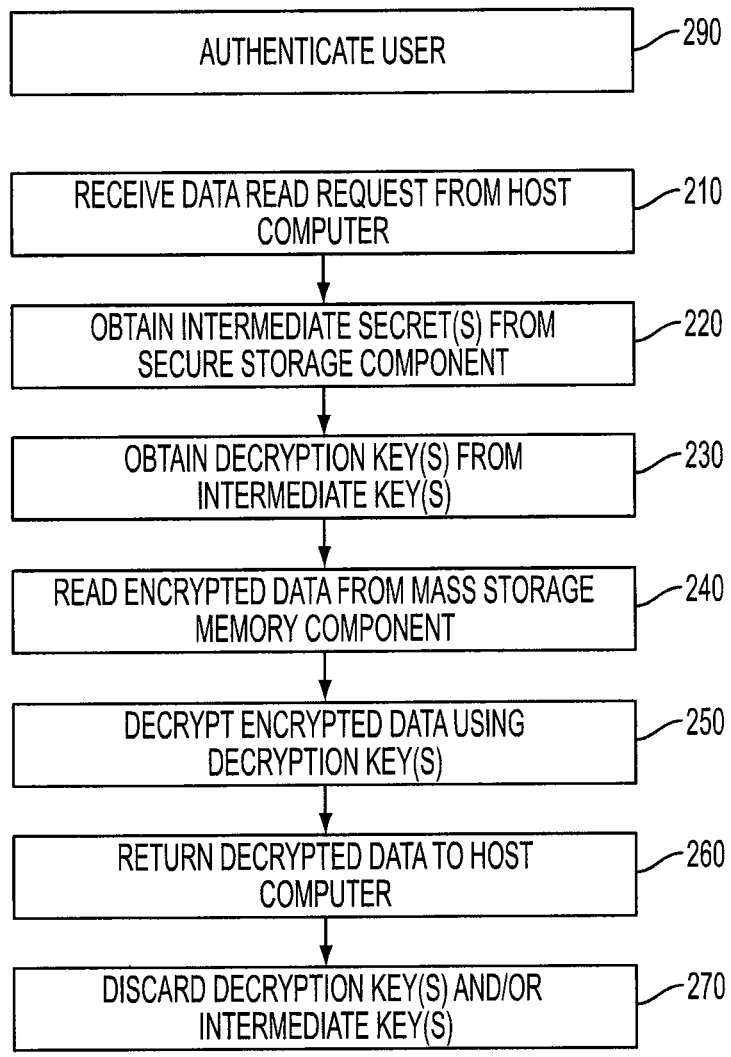
FIG. 2 is a flow chart depicting different steps of the process of reading secured data from a mass storage device in accordance with aspects of the present invention.

FIG. 2 illustrates the process of reading secured data from the device (100) in some embodiments of the invention. In step (210) the mass storage device (100) receives from the host computer (190) over the communication interface (110) a request to read secured data. In step (220) the high-speed encryption/decryption component (120) obtains one or more intermediate secrets from the secure key storage component (140). In step (230) the high-speed encryption/decryption component (120) obtains one or more decryption keys using the one or more intermediate secrets obtained from the secure key storage component (140). In step (240) the high-speed encryption/decryption component (120) reads encrypted data from the mass-storage memory component (130). In step (250) the high-speed encryption/decryption component (120) uses the one or more decryption keys that it obtained to decrypt the encrypted data that it read from the mass-storage memory component (130). In step (260) the mass storage device (100) returns the decrypted data to the host computer in response to the data request (210). In step (270) the high-speed encryption/decryption component (120) may in some embodiments discard the intermediate secrets and/or decryption keys.

In some embodiments step (220) includes the high-speed encryption/decryption component (120) submitting data that the secure key storage component (140) uses with master secrets stored in the secure key storage component (140) to generate the intermediate secrets. In some embodiments this data includes encrypted secrets that the secure key storage component (140) decrypts with master secrets stored in the secure key storage component (140) or with one or more keys derived from these master secrets.

Although the different steps have been explained above in a certain order this does not imply that these steps have to be done in this same order in all embodiments. For example in some embodiments the obtaining (220) of the one or more intermediate secrets or the obtaining (230) of the decryption keys may happen before the host computer's sending (210) of a command to the mass storage device (100) to read secured data. In other embodiments the obtaining (220) of the one or more intermediate secrets or the obtaining (230) of the decryption keys may happen after the reading (240) of encrypted data from the secure key storage component (140).

In some embodiments the obtaining (220) of the one or more intermediate secrets is preceded by a step (290) of authenticating the user.

In some embodiments the high-speed encryption/decryption component (120) obtains (220) one or more intermediate secrets from the secure key storage component (140) and obtains (230) one or more decryption keys using the one or more intermediate secrets obtained (220) from the secure key storage component (140) each time that the host computer (190) sends (210) a command to the mass storage device (100) to read secured data, and discards (270) each time the intermediate secrets and/or the decryption keys when the encrypted data read from the mass-storage memory component (130) have been decrypted (250). In other embodiments the high-speed encryption/decryption component (120) obtains (220) one or more intermediate secrets from the secure key storage component (140) and/or obtains (230) one or more decryption keys once, and maintains the intermediate secrets and/or decryption keys to be used every time the host computer (190) sends (210) a command to the mass storage device (100) to read secured data, and eventually discards (270) the intermediate secrets and/or decryption keys following certain events such as disconnecting or de-activating de mass storage device (100) or a log-off or de-authentication of the user or a failed user authentication attempt or after expiry of a certain time-out or some other event.

In some embodiments the high-speed encryption/decryption component (120) uses in step (250) a symmetric decryption algorithm to decrypt the encrypted data read from the mass-storage memory component (130). In some embodiments this symmetric decryption algorithm may for example include AES or 3DES.

Figure 3:
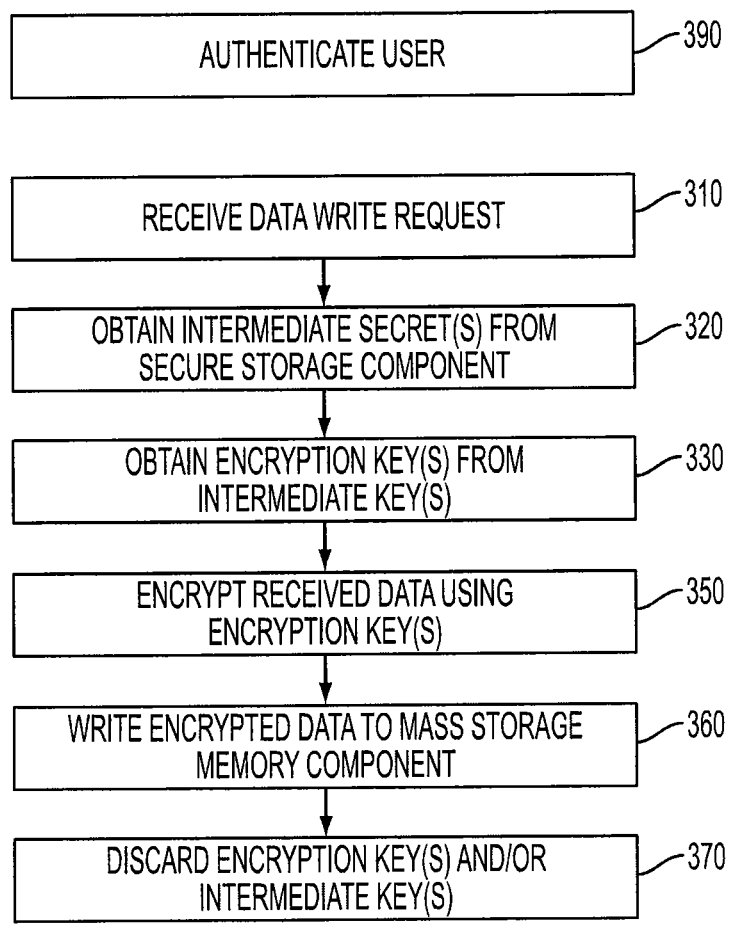
FIG. 3 is a flow chart depicting different steps of the process of writing secured data to a mass storage device in accordance with aspects of the present invention.

FIG. 3 illustrates the process of writing secured data to the device (100) in some embodiments of the invention.

In step (310) the mass storage device (100) receives from the host computer (190) over the communication interface (110) a request to write secured data along with the data to be written. In step (320) the high-speed encryption/decryption component (120) obtains one or more intermediate secrets from the secure key storage component (140). In step (330) the high-speed encryption/decryption component (120) obtains one or more encryption keys. In some embodiments the encryption/decryption component (120) obtains one or more encryption keys using the one or more intermediate secrets obtained from the secure key storage component (140). In a particular embodiment the encryption/decryption component (120) does not use the one or more intermediate secrets obtained from the secure key storage component (140) to obtain the one or more encryption keys. In a particular embodiment the encryption/decryption component (120) obtains one or more encryption keys by randomly generating them or by deriving them from randomly generated seed values. In step (350) the high-speed encryption/decryption component (120) uses the one or more encryption keys that it obtained to encrypt the data received from the host computer in step (310). In step (360) the high-speed encryption/decryption component (120) writes the encrypted data into the mass-storage memory component (130). In step (370) the high-speed encryption/decryption component (120) may in some embodiments discard the intermediate secrets and/or encryption keys. In some particular embodiments step (370) includes the encryption of the encryption keys or values that are mathematically related to the encryption keys and that at a later stage can be used to reconstruct the encryption keys, and the encrypted encryption keys are stored outside the secure key storage component (140), e.g., in the mass-storage memory component (130). In some particular embodiments this encryption is done by the encryption/decryption component (120) using the intermediate secrets obtained from the secure key storage component (140). In some particular embodiments the encryption is done by the secure key storage component (140) using master secrets stored in the secure key storage component (140) or using secrets derived from master secrets stored in the secure key storage component (140). In some particular embodiments this encryption is done using an asymmetric cryptographic algorithm and an asymmetric public key of a public-private key pair the private key of which is included in the master secrets stored in the secure key storage component. In a particular embodiment the process of writing secured data to the device (100) does not include a step (320) wherein the high-speed encryption/decryption component (120) obtains one or more intermediate secrets from the secure key storage component (140).

In some embodiments step (320) includes the high-speed encryption/decryption component (120) submitting data that the secure key storage component (140) uses with master secrets stored in the secure key storage component (140) to generate the intermediate secrets. In some embodiments this data includes encrypted secrets that the secure key storage component (140) decrypts with master secrets stored in the secure key storage component (140) or with one or more keys derived from these master secrets.

Although the different steps have been explained above in a certain order this does not imply that these steps have to be done in this same order in all embodiments. For example in some embodiments the obtaining (320) of the one or more intermediate secrets or the obtaining (330) of the encryption keys may happen before the host computer's sending (310) of a command to the mass storage device (100) to write secured data.

In some embodiments the obtaining (320) of the one or more intermediate secrets is preceded by a step (390) of authenticating the user.

In some embodiments the high-speed encryption/decryption component (120) obtains (320) one or more intermediate secrets from the secure key storage component (140) and obtains (330) one or more encryption keys using the one or more intermediate secrets obtained (320) from the secure key storage component (140) each time that the host computer (190) sends (310) a command to the mass storage device (100) to write secured data, and discards (370) each time the intermediate secrets and/or the decryption keys when the encrypted data read from the mass-storage memory component (130) have been encrypted (350). In other embodiments the high-speed encryption/decryption component (120) obtains (320) one or more intermediate secrets from the secure key storage component (140) and/or obtains (330) one or more encryption keys once, and maintains the intermediate secrets and/or encryption keys to be used every time the host computer (190) sends (310) a command to the mass storage device (100) to write secured data, and eventually discards (370) the intermediate secrets and/or encryption keys following certain events such as disconnecting or de-activating de mass storage device (100) or a log-off or de-authentication of the user or a failed user authentication attempt or after expiry of a certain time-out or some other event.

Figure 4:
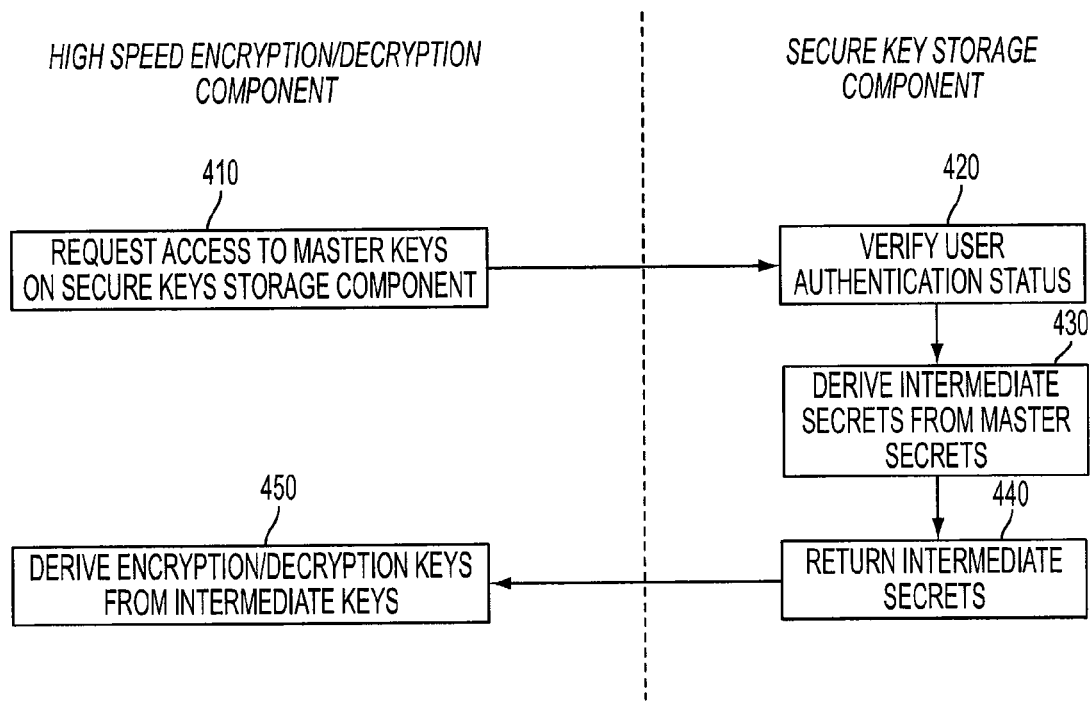
FIG. 4 is a flow chart depicting some steps of the process to obtain the bulk encryption/decryption keys in accordance with aspects of the present invention.

FIG. 4 illustrates the process of obtaining the encryption/decryption keys in some embodiments of the invention.

In step (410) the high-speed encryption/decryption component (120) sends a request to the secure key storage component (140) to obtain one or more intermediate secrets. In some embodiments the secure key storage component (140) verifies in step (420) the user authentication status and continues with the following steps if the user has been successfully authenticated and returns an error code otherwise. In step (430) the secure key storage component (140) derives one or more intermediate secrets from one or more master secrets securely stored in the secure key storage component (140). In step (440) the secure key storage component (140) returns the derived one or more intermediate secrets to the high-speed encryption/decryption component (120). In step (450) the high-speed encryption/decryption component (120) derives one or more encryption/decryption keys from the intermediate secrets it received from the secure key storage component (140).

In some embodiments the secure key storage component (140) includes a smart card and the communication between the high-speed encryption/decryption component (120) and the secure key storage component (140) in steps (410) and (440) includes the exchange of one or more ISO/IEC 7816 smart card commands and responses.

In some embodiments deriving (430) one or more intermediate secrets may include using cryptographic algorithms such as symmetric or asymmetric encryption or decryption algorithms such as AES, 3DES or RSA or cryptographic hashing algorithms such as SHA-1. In other embodiments deriving (430) one or more intermediate secrets may include one or more operations such as a trivial operation like copying or taking the values of one or more stored master secrets as is to be the intermediate secrets. In some embodiments one or more intermediate secrets may be derived by copying or taking the values of one or more stored master secrets as is.

In some embodiments deriving (450) one or more encryption/decryption keys may include using cryptographic algorithms such as symmetric or asymmetric encryption or decryption algorithms such as AES, 3DES or RSA or cryptographic hashing algorithms such as SHA-1. In other embodiments deriving (450) one or more encryption/decryption keys may include or consist of a trivial operation such as copying or taking the values of one or more received intermediate secrets as is to be the encryption/decryption keys.

In some embodiments deriving the intermediate secrets (430) or deriving the encryption/decryption keys (450) may include using data related to user authentication. In some particular embodiments this user authenticated data may include a PIN or password value.

In some embodiments deriving the intermediate secrets (430) or deriving the encryption/decryption keys (450) may include using data stored on the mass-storage memory component (130). In some embodiments deriving the intermediate secrets (430) or deriving the encryption/decryption keys (450) may include decrypting encrypted secrets stored on the mass-storage memory component (130). In some embodiments deriving the intermediate secrets (430) or deriving the encryption/decryption keys (450) may include decrypting encrypted secrets stored on the mass-storage memory component (130) with a key that is mathematically related to a master secret stored in the secure key storage component (140). In some embodiments deriving the intermediate secrets (430) or deriving the encryption/decryption keys (450) may include decrypting encrypted secrets stored on the mass-storage memory component (130) with a symmetric decryption algorithm and a key that is mathematically related to a master secret stored in the secure key storage component (140). In some embodiments deriving the intermediate secrets (430) or deriving the encryption/decryption keys (450) may include decrypting encrypted secrets stored on the mass-storage memory component (130) with an asymmetric cryptographic algorithm and a private key that is mathematically related to a master secret stored in the secure key storage component (140).

In some embodiments step (410) includes the high-speed encryption/decryption component (120) providing the secure key storage component (140) with data that the secure key storage component uses with a master secret stored in the secure key storage component (140) to derive (430) the intermediate secrets. In some embodiments this data may include an encrypted secret. In some embodiments deriving (430) the intermediate secrets may include the secure key storage component (140) decrypting the encrypted secret with a key mathematically related to a master secret stored in the secure key storage component (140). In some embodiments the intermediate secrets may include a secret that includes or that is derived from the decrypted secret.

In the following paragraphs, following notations, conventions and abbreviations are used.

| Notation | Definition |
| --- | --- |
| Encrypt( ) | The function Encrypt( ) denotes encryption with a symmetric block cipher such as 3DES and AES. This function takes following parameters (in this order): Plaintext Key Name of encryption algorithm Name of encryption mode Initialization Vector Name of padding algorithm |
| Decrypt( ) | The function Decrypt( ) denotes encryption with a symmetric block cipher such as 3DES and AES. This function takes following parameters (in this order): Plaintext Key Name of encryption algorithm Name of encryption mode Initialization Vector Name of padding algorithm |
| A ∥ B | Concatenation of two bitstrings A and B |
| AES | Advanced Encryption Standard |
| CBC-mode | Cipher Block Chaining mode |
| 3DES | Triple DES, Data Encryption Standard |
| MSD | Mass Storage Device |
| {SomeData}SomeKey | The data SomeData encrypted with key SomeKey using some encryption algorithm |

In the following paragraphs a first particular embodiment of the memory encryption method for one embodiment of the mass storage device (100) is explained in more detail.

The memory encryption algorithm of this embodiment as described below defines how a single sector is encrypted. If multiple sectors are encrypted at the same time, the memory encryption algorithm may be applied to each sector individually. Typical sector sizes are 512 bytes, 1024 bytes, etc. The memory encryption algorithm for the mass storage device is in this embodiment based on AES in CBC-mode (Cipher Block Chaining mode).

The memory encryption algorithm is distributed over two components of the mass storage device (100):
- a secure key storage component (140) that is capable of securely storing secrets. In this embodiment the secure key storage component is capable of cryptographic operations to derive a bulk encryption/decryption key from master keys securely stored in the secure key storage component. This secure key storage component may include a smart card or smart card chip.
- a high-speed encryption/decryption component (120) that is capable of encrypting and decrypting at high speed data that is written to or read from the mass storage memory of the mass storage device.

Support of three-key 3DES on secure key storage components is now described. One embodiment of the memory encryption algorithm is targeted at secure key storage components supporting the 3DES block cipher with 168-bit keys. In this case the memory encryption algorithm will derive an AES-256 key with full entropy of 256 bits.

If the secure key storage component only supports 3DES with 112-bit key sizes, the entropy of the AES-key used to encrypt the sectors will be 224 bits instead of 256 bits.

In the remainder of the description of this first embodiment, we assume that the secure key storage component supports 3DES with 168-bit keys.

The memory encryption algorithm involves an ID of the secure key storage component. This ID will be referred to as the Chip ID, or as the chip serial number. This Chip ID is a unique identifier for a secure key storage component of a given type or brand. The length of the Chip ID is dependent on the type or brand of the specific secure key storage component being used. Throughout the following paragraphs, the Chip ID length is referred to using the parameter L. This parameter should be replaced by the correct length of the Chip ID depending on the targeted secure key storage component.

Figure 5:
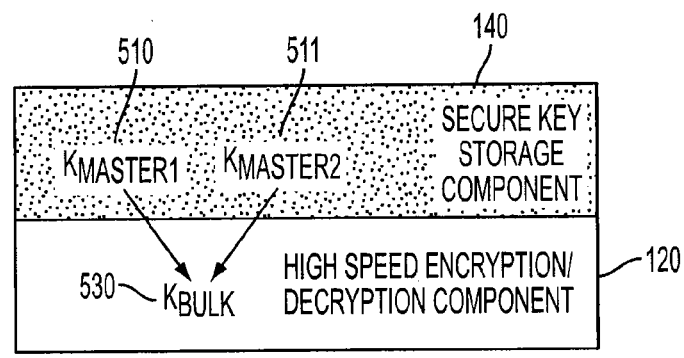
FIG. 5 is a block diagram depicting a mass storage device and a security key hierarchy in accordance with aspects of the present invention.

Table 1 below and FIG. 5 provide an overview of the cryptographic keys involved in the memory encryption algorithm of this embodiment.

TABLE 1

| | | | | |
| --- | --- | --- | --- | --- |
| Cryptographic keys | | | | |
| Key name | Symbol | Purpose | Key type and length | Key generation |
| MSD Master Keys | $K_{Master1}$, $K_{Master2}$ | Used to derive $K_{Base}$ | 3DES 168 bits | Generated at random and on-the-fly by MSD Initialization Tool Permanently stored on secure key storage component, and not by the MSD Initialization Tool. |
| MSD bulk encryption/ decryption key | $K_{Bulk}$ | Used to encrypt the sectors | AES 256 bits | Not permanently stored Generated on-the-fly by secure key storage components for each encryption/decryption session. Discarded after use. |

Figure 6:
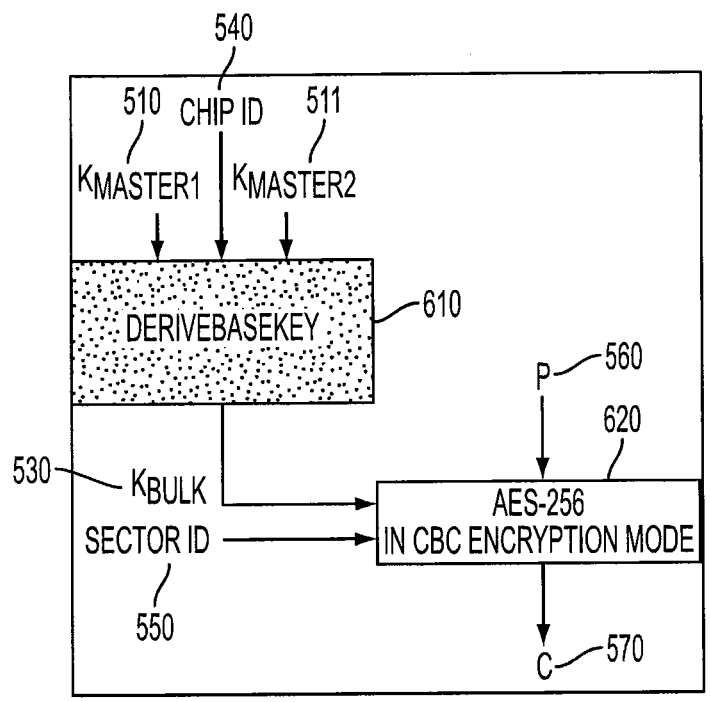
FIG. 6 is a block diagram depicting an encryption algorithm in accordance with aspects of the present invention.
Figure 7:
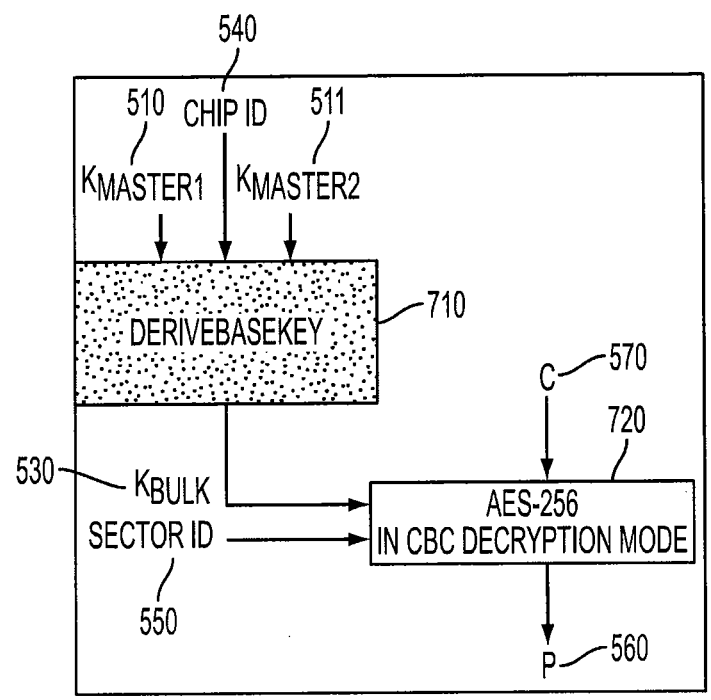
FIG. 7 is a block diagram depicting a decryption algorithm in accordance with aspects of the present invention.

As illustrated in FIGS. 6 and 7, the memory encryption and decryption algorithms of this embodiment include two phases: (1) derivation (610, 710) of the bulk encryption/decryption key (further referred to as $K_{Bulk}$) to encrypt a given sector, and (2) bulk encryption (620) or decryption (720) of the given sector using AES-256 in CBC-mode with the derived bulk encryption key $K_{Bulk}$.

Key derivation—The secure key storage component computes the bulk encryption/decryption key $K_{Bulk}$ (530) from the Chip ID (540) and the master keys $K_{Master1}$ (510) and $K_{Master2}$ (511) and provides it to the high-speed encryption/decryption component. In one embodiment the Chip ID has a length of L bytes, the master keys $K_{Master1}$ and $K_{Master2}$ have a length of 168 bits and the resulting bulk encryption/decryption key $K_{Bulk}$ has a length of 256 bits. For the computation (610, 710) of the bulk encryption/decryption key $K_{Bulk}$ the secure key storage component uses a function that derives the key $K_{Bulk}$ from the master keys $K_{Master1}$ and $K_{Master2}$ so that the entropy of $K_{Bulk}$ equals 256 bits using some key derivation algorithm known in the art. In other embodiments the secure key storage component provides the master keys $K_{Master1}$ and $K_{Master2}$ to the high-speed encryption/decryption component which then computes the bulk encryption/decryption key $K_{Bulk}$ itself.

Encryption—The high-speed encryption/decryption component creates an initialization vector IV using the Sector ID (550). The Sector ID is a 4 bytes data element that identifies the given sector to be encrypted. The high-speed encryption/decryption component encrypts (620) the plaintext P (560) of the given sector using AES-256 in CBC-mode with the 256 bits bulk encryption/decryption key $K_{Bulk}$, and the initialization vector IV i.e. C←Encrypt($K_{Bulk}$, P, AES-256, CBC, IV). The high-speed encryption/decryption component provides the ciphertext C (570) to be written to the given sector of the mass storage memory component. Both the plaintext P and the ciphertext C have the length of a single sector.

Decryption—The high-speed encryption/decryption component creates an initialization vector IV using the Sector ID (550). The high-speed encryption/decryption component decrypts (720) the ciphertext C (570) of the given sector of the mass storage memory component using AES-256 in CBC-mode with the 256 bits bulk encryption/decryption key $K_{Bulk}$, and the initialization vector IV i.e. P←Decrypt($K_{Bulk}$, C, AES-256, CBC, IV). The high-speed encryption/decryption component provides the plaintext P (560) to be returned to the host computer. Both the plaintext P and the ciphertext C have the length of a single sector.

In the following paragraphs a second particular embodiment of the memory encryption method for one embodiment of the mass storage device is explained in more detail. The memory encryption algorithm of one embodiment as described below defines how a single sector is encrypted. If multiple sectors are encrypted at the same time, the memory encryption algorithm may be applied to each sector individually. Typical sector sizes are 512 bytes, 1024 bytes, etc.

The memory encryption algorithm for the mass storage device is in this embodiment based on AES in CBC-mode. The memory encryption algorithm is distributed over two components of the mass storage device (100):
  a secure key storage component (140) that is capable of securely storing secrets. In this embodiment the secure key storage component is capable of cryptographic operations to derive a key from master keys. This secure key storage component may include a smart card or smart card chip.
  a high-speed encryption/decryption component (120) that is capable of encrypting and decrypting at high speed data that is written to or read from the mass storage memory component of the mass storage device.

Table 2 below provide an overview of the cryptographic keys involved in the memory encryption algorithm of this embodiment.

TABLE 2

Cryptographic keys

| Key name | Symbol | Purpose | Key type and length | Key generation |
|---|---|---|---|---|
| MSD Master Keys | $K_{Master1}$, $K_{Master2}$ | Used to derive $K_{Base}$ | 3DES 168 bits | Permanently stored on the secure key storage component |

TABLE 2-continued

Cryptographic keys

| Key name | Symbol | Purpose | Key type and length | Key generation |
|---|---|---|---|---|
| MSD Intermediate Key | $K_{Base}$ | Used to derive $K_{Sector}$ for each sector | AES 256 bits | Not permanently stored. Generated on-the-fly by the secure key storage component for each encryption/decryption session. Discarded after use. |
| MSD Sector Encryption Key | $K_{Sector}$ | Used to encrypt a certain sector | AES 256 bits | Not permanently stored. Generated on-the-fly by the high-speed encryption/decryption component; different for each sector. Discarded after use. |

Figure 8:
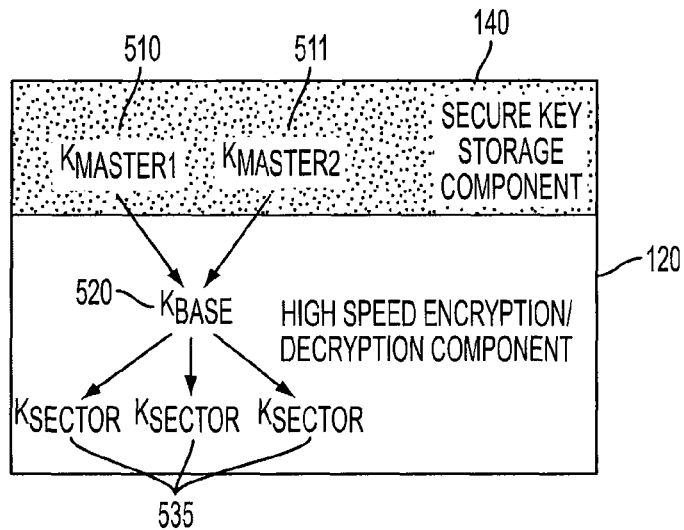
FIG. 8 is a block diagram depicting an alternative mass storage device e and security key hierarchy in accordance with aspects of the present invention.
Figure 9:
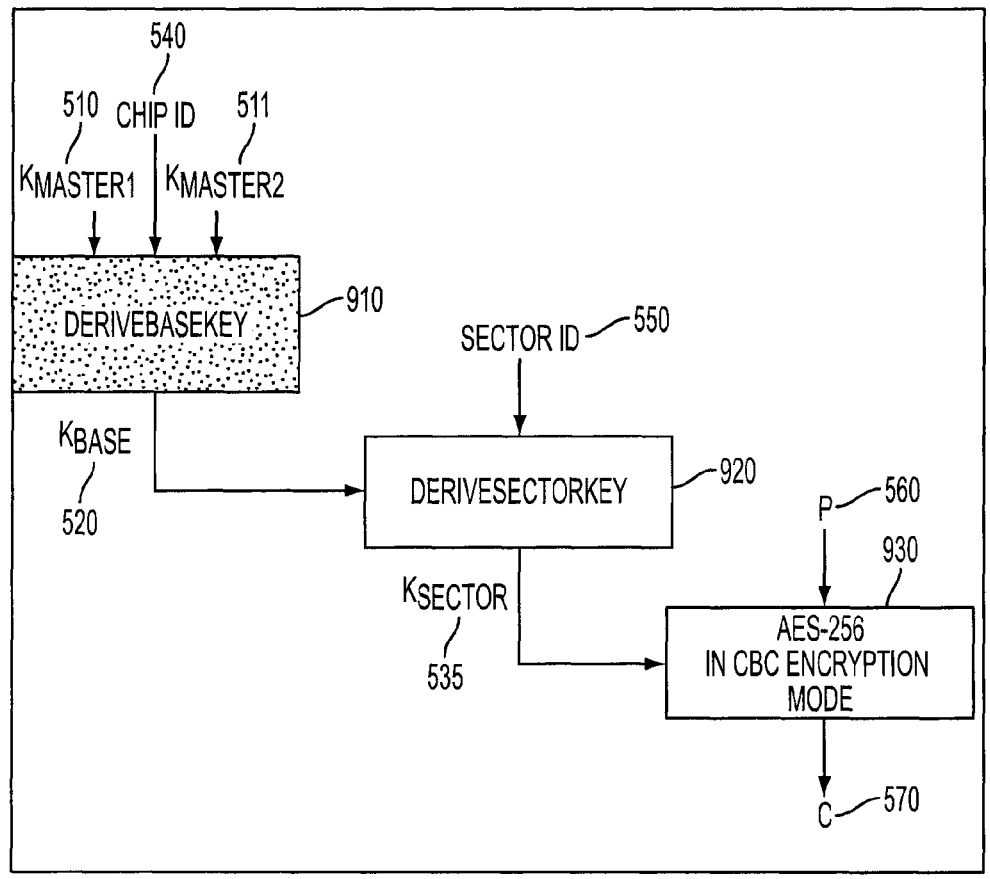
FIG. 9 is a block diagram depicting an alternative encryption algorithm in accordance with aspects of the present invention.
Figure 10:
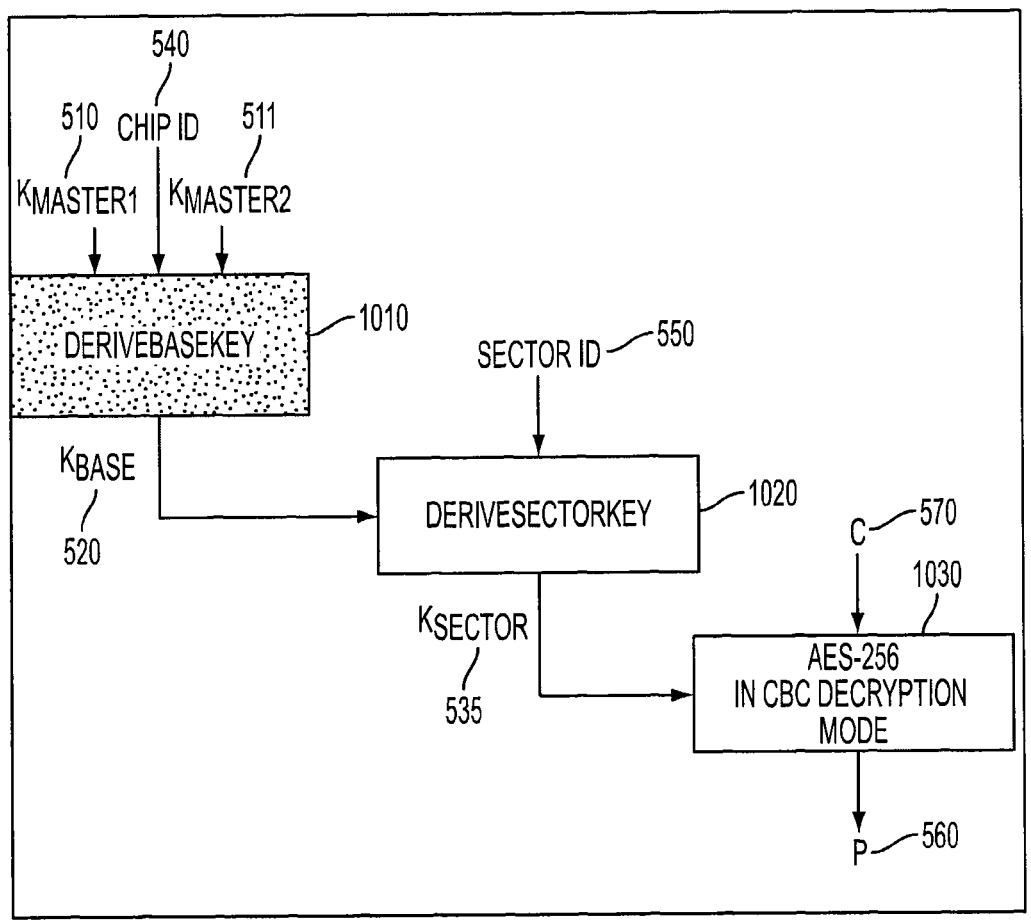
FIG. 10 is a block diagram depicting an alternative decryption algorithm in accordance with aspects of the present invention.

FIG. 8 shows the key hierarchy for the keys involved in the memory encryption algorithm of this embodiment. Encryption and decryption algorithms As illustrated in FIGS. 9 and 10, the memory encryption and decryption algorithms of this embodiment include two phases: (1) derivation of the key to encrypt the given sector (910, 920, 1010, 1020), and (2) encryption (930) or decryption (1030) using AES-256 in CBC-mode.

Key derivation—The key derivation itself happens in two steps. In a first step the secure key storage component (120) computes (910, 1010) the intermediate key $k_{Base}$ (520) from the Chip ID (540) and the master keys $K_{master1}$ (510) and $K_{Master2}$ (511) and provides it to the high-speed encryption/decryption component (120) i.e. $K_{Base}$←DeriveBaseKey (Chip ID, $K_{master1}$, $K_{Master2}$). In one embodiment the Chip ID has a length of L bytes, the master keys $K_{Master1}$ and $K_{Master2}$ have a length of 168 bits, and the intermediate key $K_{Base}$ has a length of 256 bits. For the computation of the intermediate key $K_{Base}$ the secure key storage component uses a function that derives the key $K_{Base}$ from the Chip ID and the master keys $K_{Master1}$ and $K_{Master2}$ using some key derivation algorithm known in the art so that the entropy of $K_{Base}$ equals 256 bits.

In a second step the high-speed encryption/decryption component derives (920, 1020) the sector encryption/decryption key $K_{Sector}$ (535) from the intermediate key $K_{Base}$ (520) and the Sector ID (550) i.e. $K_{Sector}$←DeriveSectorKey ($K_{Base}$, Sector ID). The Sector ID is a 4 bytes data element that identifies the given sector to be encrypted or decrypted. In one embodiment the resulting sector encryption/decryption key $K_{Sector}$ has a length of 256 bits. For the computation of the intermediate key $K_{Base}$ the secure key storage component uses a function that derives the key $K_{Sector}$ from the Sector ID and the intermediate key $K_{Base}$ using some key derivation algorithm known in the art so that the entropy of $K_{Sector}$ equals 256 bits.

Encryption—The high-speed encryption/decryption component creates an initialization vector IV using the Sector ID. The high-speed encryption/decryption component encrypts (930) the plaintext P (560) using AES-256 in CBC-mode with the key $K_{Sector}$ (535) and the initialization vector IV i.e. C←Encrypt($K_{Sector}$, P, AES-256, CBC, IV). The high-speed encryption/decryption component provides the ciphertext C (570) to be written to the given sector of the mass storage memory component. Both the plaintext P and the ciphertext C have the length of a single sector.

Decryption—The high-speed encryption/decryption component creates an initialization vector IV using the Sector ID. The high-speed encryption/decryption component decrypts (1030) the ciphertext C (570) using AES-256 in CBC-mode with the key $K_{Sector}$ (535) and the initialization vector IV i.e. C←Decrypt($K_{Sector}$, P, AES-256, CBC, IV). The high-speed encryption/decryption component provides the plaintext P (560) to be returned to the host computer. Both the plaintext P and the ciphertext C have the length of a single sector.

The following paragraphs describe some cryptographic aspects of an example of an initialization process to securely initialize a particular embodiment of a mass storage device (100) (further also referred to as the MSD) according to the present invention, as performed by a mass storage device (100) and a mass storage device initialization tool (further also referred to as the MSD Initialization Tool (90)).

Table 3 below provides an overview of the cryptographic keys involved in the MSD initialization process of the present embodiment.

TABLE 3

Cryptographic keys

| Key name | Symbol | Purpose | Key type and length | Key generation |
|---|---|---|---|---|
| MSD Perso Public/Private Key Pair | $SK_{Perso}$, $PK_{Perso}$ | Used to exchange a symmetric session key between the MSD and the MSD Initialization Tool | RSA 2048 bits The value of the public exponent equals 0x10001 | MSD Perso Private Key is stored inside the HSM (Hardware Security Module) of the MSD Initialization Tool. MSD Perso Public Key is stored by the high-speed encryption/decryption component of every MSD. |
| MSD Perso Session Key | $K_{Session}$ | Used to compute a MAC (Message Authentication Code) over an initialization command | AES 256 bits | Not permanently stored. Generated at random by the high-speed encryption/decryption component of the MSD for every initialization session. Discarded after use. |
| MSD Master Keys | $K_{Master1}$, $K_{Master2}$ $K_{Base}$ | Used to derive | 3DES 168 bits | Generated at random and on-the-fly by MSD Initialization Tool. Permanently stored on the secure key storage component, and not by the MSD Initialization Tool. |

An MSD initialization session of this embodiment includes three phases:

Phase 1 (2100): Key establishment. The purpose of this phase is to start an initialization session between the MSD and MSD Initialization Tool. More specifically, during this phase, the MSD authenticates the MSD Initialization Tool, and the MSD and MSD Initialization Tool establish a secret session key.

Phase 2 (2200): Initialization. The purpose of this phase is to perform the actual initialization, such as reading data from the MSD and writing data to the MSD.

Phase 3 (2300): Termination. The purpose of this phase is to stop the initialization session.

Figure 11:
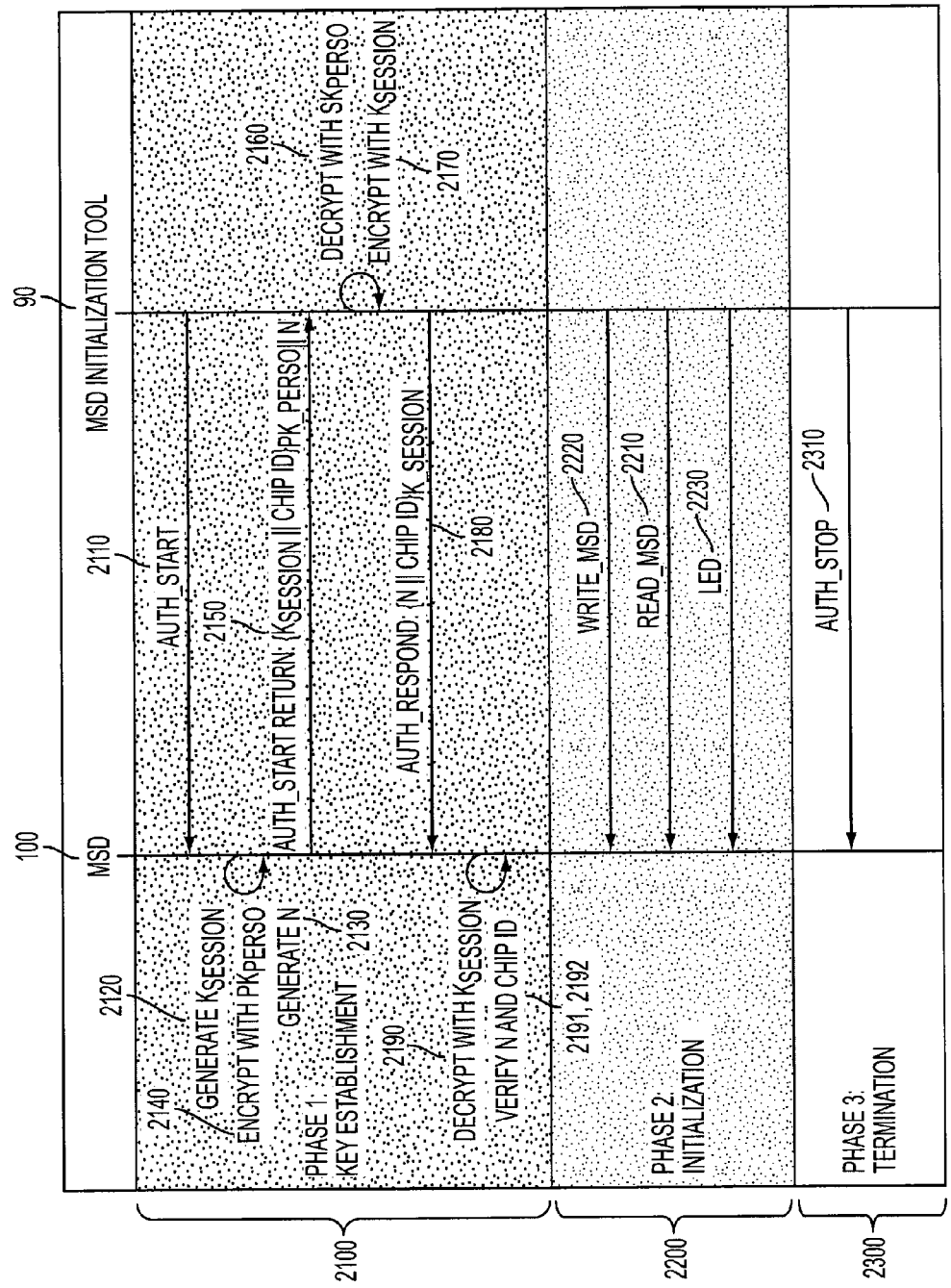
FIG. 11 is a flow chart depicting initialization of a mass storage device in accordance with an aspect of the present invention.

An initialization session process is illustrated in FIG. 11.

Phase 1 (2100): Key establishment—The key establishment phase consists of following steps.

Step 1—The MSD Initialization Tool sends (2110) the AUTH_START command to the MSD. The AUTH_START command is not protected.

Step 2—If the AUTH_START command is successful, the MSD performs following steps:

a. The MSD randomly generates (2120) a symmetric MSD Perso Session Key KSession.

b. The MSD randomly generates (2130) a nonce N, and stores it as long as the session lasts.

c. The MSD looks up the Chip ID.

d. The MSD encrypts (2140) the MSD Perso Session Key and Chip ID using the MSD Perso Public Key PKPerso according to the RSAES-PKCS1-v1_5 algorithm.

e. The MSD returns (2150) following value to the MSD Initialization Tool:

{KSession || Chip ID}PK_Perso || N

Step 3—Upon receipt of the AUTH_START return value, the MSD Initialization Tool performs following steps:

a. The MSD Initialization Tool decrypts (2160) the cryptogram using the MSD Perso Private Key SKPerso and the RSAES-PKCS1-v1_5 algorithm, and recovers the MSD Perso Session Key KSession.

b. The MSD Initialization tool encrypts (2170) the nonce N and Chip ID using the MSD Perso Session Key KSession with AES in CBC-mode.

c. The MSD Initialization Tool sends (2180) the AUTH_RESPONS command to the MSD, containing following payload:

{N || Chip ID}K_Session

Step 4—Upon receipt of the AUTH_RESPONS command, the MSD performs following steps:

a. The MSD decrypts (2190) the cryptogram using the MSD Perso Session Key KSession.

b. The MSD verifies (2191) whether the nonce included in the cryptogram corresponds to the session nonce. If the nonces do not match, the MSD stops the key establishment phase.

c. The MSD verifies (2192) whether the Chip ID included in the cryptogram corresponds to its own value of the Chip ID. If the Chip ID values do not match, the MSD stops the key establishment phase.

Phase 2 (2200): Initialization

The MSD Initialization Tool uses the READ, WRITE and LED operations to read (2210) and write (2220) data from/to the MSD and to set (2230) the status of the LED of the MSD, respectively.

The MSD must only accept READ, WRITE and LED operations from a genuine MSD Initialization Tool. Therefore, these operations are protected with a MAC computed using the MSD Perso Session Key.

Phase 3 (2300): Termination

In the Termination phase, the MSD Initialization Tool ends the initialization session with the MSD by sending (2310) the STOP command to the MSD.

Upon termination of the session, the MSD discards the MSD Perso Session Key and nonce.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A mass storage device for storing data comprising
 a communication interface comprising a universal serial bus (USB) connector configured to communicate with a connected host computer;
 a mass-memory storage component;
 a secure key storage component configured to securely store a master secret and to cryptographically derive one or more intermediate secrets from the master secret, wherein the secure key storage component is adapted to authenticate a user on the basis of a personal identification number (PIN), a password, or a biometric measurement and wherein accessing the at least one master secret stored on the secure key storage component is subjected by the secure key storage component to access control mechanisms with the secure key storage component granting or denying access to the at least one master secret depending on a user authentication status such that the secure key storage component denies access to the at least one master secret if the user has not been authenticated; and
 an encryption-decryption component that is different from the secure key storage component, that is connected to the secure key storage component, the mass-memory storage component, and the USB connector, and that is configured to:
  handle the USB protocol with the host computer;
  encrypt data received from the host computer via the communication interface using an encryption algorithm and at least one bulk encryption key;
  write the encrypted data into and read the encrypted data from the mass-memory storage component,
  obtain at least one bulk decryption key by accessing the master secret securely stored in the secure key storage component, the security of the at least one bulk decryption key protected using the master secret securely stored in the secure key storage component, wherein the encryption-decryption component accessing the master secret securely stored in the secure key storage component for obtaining the at least one bulk decryption key comprises:
   retrieving an intermediate secret from the secure key storage component, wherein the secure key storage component cryptographically derives the intermediate secret from the master secret using a cryptographic algorithm, and
   deriving the at least one bulk decryption key using the retrieved intermediate secret;
  decrypt encrypted data stored in the mass-memory storage component for return to the host computer via the communication interface in response to a read data command from the host computer, whereby said decrypting uses a decryption algorithm and the at least one bulk decryption key; and
  discard the intermediate secret after the encrypted data is decrypted.

2. The device of claim 1, wherein the secure key storage component comprises a smart card chip.

3. The device of claim 1:
 wherein the device obtains the at least one bulk decryption key and the at least one bulk encryption key by cryptographically deriving the at least one bulk decryption key and the at least one bulk encryption key from the master secret and a sector identifier identifying a sector of the mass-memory storage component to be encrypted or decrypted.

4. The device of claim 1, wherein the encryption-decryption component is further configured to:
 obtain the at least one bulk encryption key by accessing the master secret securely stored in the secure key storage component.

5. The device of claim 4, wherein the encryption-decryption component accessing the master secret securely stored in the secure key storage component for obtaining the at least one bulk encryption key comprises:
 retrieving a second intermediate secret from the secure key storage component, wherein the secure key storage component cryptographically derives the second intermediate secret from the master secret using a cryptographic algorithm, and
 deriving the at least one bulk encryption key using the second intermediate secret, the second intermediate secret discarded after the data is encrypted.

* * * * *